Patented Feb. 2, 1932

1,843,427

UNITED STATES PATENT OFFICE

SIMON J. LUBOWSKY, OF JERSEY CITY, NEW JERSEY, ASSIGNOR TO METAL & THERMIT CORPORATION, OF CARTERET, NEW JERSEY, A CORPORATION OF NEW JERSEY

METHOD OF MAKING MAGNESIUM TITANATE

No Drawing.   Application filed October 25, 1929.   Serial No. 402,551.

This invention relates to making magnesium titanate; and it comprises a method of making a magnesium titanate containing titanium in readily available form, wherein rutile and magnesia are intimately admixed in finely ground form, and the mixture fired by exposure to fire gases in a kiln under brick-making conditions, the mixture advantageously being in briquet form and firing being at an average kiln temperature of about Seger cone 14 (1410° C.) and being continued for a prolonged period; firing advantageously being under conditions producing reduction to a substantial degree in the fired materials; all as more fully hereinafter set forth and as claimed.

In the commercial production of titanium dioxid as a pigment and for other purposes, it is usual to produce titanic acid by hydrolysis of a sulfuric acid solution of $TiO_2$ under heat and pressure; an autoclave being used. As commercial titaniferous materials usually contain iron, the titanium sulfate solutions are frequently submitted to a reducing treatment prior to hydrolysis to convert ferric iron into ferrous. Sometimes reduction is carried far enough to convert at least some of the tetravalent titanium into lower stages of oxidation, principally the trivalent.

The economical production of solutions of the proper acidity and concentration from the available titaniferous minerals is a serious technical problem. In a prior Patent No. 1,640,952 whereon the present invention is an improvement, I provided a solution of this problem by opening up rutile with magnesia; making a magnesium titanate readily attacked by sulfuric acid and other acids. Magnesia and rutile, both of about 150 mesh fineness, are mixed and the mixture heated to about Seger cone 18 till a hard semi-vitreous mass is obtained. This is readily dissolved by sulfuric acid to give a material which in solution can be hydrolyzed with production of brilliant white metatitanic acid. Prior to hydrolysis it is usual to reduce any ferric iron which may be in the solution to the ferrous state. In one good way of operating, using the process of my prior patent the baked material is taken up with sulfuric acid, the clarified solution is subjected to electrolytic reduction and then submitted to hydrolysis to make metatitanic acid.

Since neither magnesia nor titanium dioxid is appreciably fusible or volatile at the temperature used, Seger cone 18, reaction is rather slow; but can nevertheless be accomplished in about 3 hours heating. The product is, as stated, a hard semi-vitreous mass, and it indicates an incipient fusing or sintering. It is not particularly uniform in appearance, different lots having a different look; but generally speaking, the fired material is a reddish brown mass containing numerous hard particles and with the outer layers more vitrified than the inner. There are some differences in solubility between one lot and another, with corresponding differences in the solutions formed on extraction.

I have now found that a better and more uniform product can be obtained by lowering the temperature somewhat and prolonging the heating time, with a slow heating up and cooling down; by using what may be called a soaking heat. Under these conditions local vitrification does not occur; and the product is a soft, baked mass, free of gritty particles. It goes into solution in dilute sulfuric acid practically completely and solutions can be made giving on hydrolysis, metatitanic acid of high and uniform quality.

By performing the heating under reducing conditions, the necessity for submitting solutions subsequently made to special reducing operations is obviated and the whole process of producing pigmentary $TiO_2$ from rutile becomes considerably simplified. Reduction in making a reduced baked briquet, may be merely sufficient to convert any iron contained in the rutile to the ferrous state, but it is better to carry it further converting some of the tetravalent titanium into trivalent, thereby preventing difficulties by accidental reoxidation in later operations. I have found the presence of some trivalent titanium at the time of hydrolysis is advantageous in any event.

Reduction may be effected by making the furnace gases of reducing character. Firing may be by producer gas with an insufficient supply of air. But it is simpler to incorporate a little charcoal or other reducing agent with the magnesia and rutile in making the mixture to be baked. Or briquets may be made with tar, molasses, sulfite waste liquor, etc. as a binder. This will often provide all the reduction desired. Both expedients may be used, a small proportion of charcoal being incorporated into the magnesia-rutile mixture and then the mixture bonded with a carbonaceous binder to make briquets.

In a practical embodiment of the present invention operating without special reduction, rutile is finely ground, usually to such a fineness as to give 90 per cent through a 150 mesh sieve and is then intimately admixed with magnesia or magnesite of equal fineness. Mixing may be dry or wet. A pebble mill is convenient in mixing. Advantageous proportions are one part by weight MgO to two parts $TiO_2$ in the form of rutile; this corresponding to the molecular ratio $MgO:TiO_2$. The mixture is made into briquets, a binder being used if desired, and these briquets baked by exposure to fire gases in a kiln under brick-making conditions. With an oxidizing atmosphere the baked briquets are brownish although lighter in color than the product of Patent No. 1,640,952; while with a non-oxidizing or a reducing atmosphere they are bluish.

In operating to produce baked material with a rather far going reduction, a reduction sufficient to convert some of the tetravalent titanium into trivalent, the mixture of rutile and magnesia made as just described receives an addition of from 10 per cent to 20 per cent finely ground charcoal. The operation is otherwise as just described.

The temperature in the kiln is determined by pyrometer or by distributed Seger cones and it is not allowed to go over Seger cone 14 (1410° C.) as a maximum but is kept near this temperature for 6 or 8 hours with a much longer time for heating up and cooling down. The total time of operation ranges from four days to a week; the particular time depending on the size and type of kiln and the size of briquet.

With Seger cones in the kiln, the temperatures indicated are those of the circulating gases and not of the briquets; the latter being at a temperature which averages lower. But observation has shown that with briquets of usual size, say oblongs 6 inches by 6 inches by 12 inches, an exposure of 6 to 8 hours insures complete and uniform penetration of heat and completion of the desired reaction throughout the briquet without development of external vitrified layers or areas. The product has a baked appearance like that of a soft-baked brick.

Magnesite or magnesium carbonate may be used in lieu of magnesia. Dolomite, limestone or lime may be used in lieu of magnesia, giving a titanate preparation readily attacked by acid, but giving a product forming insoluble calcium sulfate on treatment with sulfuric acid. Sometimes this is advantageous and sometimes not. For example, it is possible to prepare a pure solution of titanium sulfate by briqueting a mixture of lime and rutile, baking the briqueted mixture at a temperature not exceeding Seger cone 14 and treating with sulfuric acid, followed by water. The lime remains as insoluble calcium sulfate, while titanium goes into solution as sulfate. However, for general purposes, I regard magnesia as the best alkaline earth metal oxid.

Other proportions than a 1:1 molecular ratio can be used; but I regard this as best. Opening up can be effected with less base, as, for instance, with a molecular ratio of 0.5 MgO to 1 $TiO_2$, but making a good baked product with this lower ratio requires more care.

By the expression "brick making conditions" I mean the thermal and atmospheric conditions prevailing in a brick kiln, but I do not limit myself to the use of brick kilns. An intimate mixture of rutile and magnesia may be fired without briqueting in a rotary inclined kiln or in any other way, producing a clinker soluble in acids, but I regard firing a briqueted mixture in an ordinary type of kiln as the most satisfactory way of operating.

What I claim is:

1. In making available the titanium of rutile, the process which comprises baking briquets containing an intimate mixture of magnesia and finely ground rutile under brick-making conditions at a temperature not exceeding Seger cone 14.

2. In making available the titanium of rutile, the process which comprises baking briquets containing an intimate mixture of magnesia and finely ground rutile under brick-making conditions at a temperature not exceeding Seger cone 14, the magnesia and rutile being in such proportions as to give a 1:1 molecular ratio of MgO and $TiO_2$.

3. In making available the titanium of rutile, the process which comprises baking briquets containing an intimate mixture of an alkaline earth metal oxid and finely ground rutile under brick-making conditions at a temperature not exceeding Seger cone 14.

4. In making available the titanium of rutile, the process which comprises baking briquets containing an intimate mixture of magnesia and finely ground rutile under reducing conditions and under brick making conditions at a temperature not exceeding Seger cone 14.

5. In making available the titanium of rutile, the process which comprises baking briquets containing an intimate mixture of magnesia and finely ground rutile under reducing conditions and at a temperature not exceeding Seger cone 14 for a length of time sufficient to secure uniform reaction throughout the briquets and reduction of any ferric iron present into the ferrous condition.

6. In making available the titanium of rutile, the process which comprises baking briquets comprising an intimate mixture containing an alkaline earth metal oxid, finely ground rutile and sufficient charcoal to reduce any ferric iron present in said mixture to the ferrous condition, said baking being under brick-making conditions at a temperature not exceeding Seger cone 14.

7. In making available the titanium of rutile, the process which comprises baking briquets of an intimate mixture containing magnesia, charcoal and finely ground rutile under brick-making conditions and at a temperature not exceeding Seger cone 14 for a length of time sufficient to secure reaction throughout the briquets.

8. In transforming the titanium dioxid of rutile into a reactive compound by calcination with magnesium oxid, the improvement which comprises heating the mixture of magnesia and rutile to a temperature not exceeding Seger cone 14 for a prolonged period.

9. In transforming the titanium dioxid of rutile into a reactive compound by calcination with magnesium oxid, the improvement which comprises incorporating in the mixture of magnesia and rutile sufficient carbon to effect reduction of any ferric iron present in the mixture to the ferrous condition and heating the mixture to a temperature not exceeding Seger cone 14 for a prolonged period.

In testimony whereof I affix my signature.

SIMON J. LUBOWSKY.